(12) United States Patent
Wang et al.

(10) Patent No.: US 10,303,222 B2
(45) Date of Patent: May 28, 2019

(54) HANDLE STRUCTURE

(71) Applicants: Chun-Chi Wang, Taipei (TW); Li-Fang Chen, Taipei (TW); Yi-Wen Liu, Taipei (TW); Chen-Hsien Cheng, Taipei (TW)

(72) Inventors: Chun-Chi Wang, Taipei (TW); Li-Fang Chen, Taipei (TW); Yi-Wen Liu, Taipei (TW); Chen-Hsien Cheng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/687,554

(22) Filed: Aug. 28, 2017

(65) Prior Publication Data

US 2018/0275723 A1 Sep. 27, 2018

(30) Foreign Application Priority Data

Mar. 22, 2017 (TW) .............................. 106109465 A

(51) Int. Cl.
*G06F 1/16* (2006.01)

(52) U.S. Cl.
CPC .............. *G06F 1/1675* (2013.01); *G06F 1/16* (2013.01)

(58) Field of Classification Search
CPC ........... G06F 1/1675; G06F 1/16; G05G 1/10; G05G 1/12; E05B 1/0007; B25G 1/10; B25G 1/102

USPC .......................... 16/414, 417, 430, 441, 443
See application file for complete search history.

(56) References Cited

U.S. PATENT DOCUMENTS

| 82,629 | A | * | 9/1868 | Needham | 16/417 |
| 1,482,765 | A | * | 2/1924 | Sanborn | A47J 45/063 16/441 |
| 2,496,714 | A | * | 2/1950 | Haines | G05G 1/10 16/441 |
| 2,601,596 | A | * | 6/1952 | Cronin | E05B 1/0007 292/347 |
| 9,377,807 | B2 | * | 6/2016 | Griffin | G06F 1/16 |
| 2004/0121864 | A1 | | 6/2004 | Morrow et al. | |

FOREIGN PATENT DOCUMENTS

| TW | M329658 | 4/2008 |
| TW | 201335730 | 9/2013 |
| TW | M468503 | 12/2013 |
| TW | M525418 | 7/2016 |
| TW | M537049 | 2/2017 |

OTHER PUBLICATIONS

"Office Action of Taiwan Counterpart Application," dated May 23, 2017, p. 1-p. 7.

\* cited by examiner

*Primary Examiner* — Roberta S Delisle
(74) *Attorney, Agent, or Firm* — JCIPRNET

(57) ABSTRACT

A handle structure including a base portion, a stop portion and a grip portion is provided. The grip portion is connected between the base portion and the stop portion. The handle structure has a cavity therein, the cavity has a bottom surface, and the bottom surface of the cavity is inclined to an axial direction of the grip portion.

17 Claims, 2 Drawing Sheets

HANDLE STRUCTURE

CROSS-REFERENCE TO RELATED APPLICATION

This application claims the priority benefit of Taiwan application serial no. 106109465, filed on Mar. 22, 2017. The entirety of the above-mentioned patent application is hereby incorporated by reference herein and made a part of this specification.

BACKGROUND OF THE INVENTION

Field of the Invention

The invention relates to a handle structure, and particularly relates to a handle structure suitable for a handheld electronic device.

Description of Related Art

Along with quick development of technology, and development of many portable or handheld electronic devices, such as notebook computers, smart phones and tablet personal computers (PCs), etc, users may use the portable or handheld electronic devices to process and transceive data at anytime anywhere, and the portable or handheld electronic devices have become indispensible tools in people's daily life. Taking the tablet PC as an example, the tablet PC has advantages of lightweight and portability, and is convenient for the users to carry around and use.

Regarding an industrial tablet PC, a handle structure can be configured at a back surface thereof for the user's finger to grip, so that it is more convenient to use and pick up. However, when the user accidentally drops the tablet PC to the ground, an impact force generated when the handle structure impacts the ground is generally transmitted to a display panel of the tablet PC directly through the handle structure, which may cause a damage of the display panel.

SUMMARY OF THE INVENTION

The invention is directed to a handle structure, which avoids damaging a display panel when a handheld electronic device drops to ground.

The invention provides a handle structure including a base portion, a stop portion and a grip portion. The grip portion is connected between the base portion and the stop portion. The handle structure has a cavity therein, the cavity has a bottom surface, and the bottom surface of the cavity is inclined to an axial direction of the grip portion.

In an embodiment of the invention, the base portion is adapted to connect a back surface of a handheld electronic device, and the axial direction of the grip portion is perpendicular to the back surface of the handheld electronic device.

In an embodiment of the invention, the bottom surface of the cavity is located in the grip portion.

In an embodiment of the invention, a part of the cavity is located in the stop portion, and the other part of the cavity is located in the grip portion.

In an embodiment of the invention, an outer diameter of the base portion is greater than an outer diameter of the grip portion, and an outer diameter of the stop portion is greater than the outer diameter of the grip portion.

In an embodiment of the invention, the stop portion includes a central region and a surrounding region, the surrounding region surrounds the central region, the grip portion is connected to the central region, and the cavity does not extend to the surrounding region.

In an embodiment of the invention, the handle structure respectively has a fixed end and a free end opposite to each other at the base portion and the stop portion, where a distance between the bottom surface of the cavity and the fixed end is greater than a distance between the bottom surface of the cavity and the free end.

In an embodiment of the invention, the distance between the bottom surface of the cavity and the fixed end is twice of the distance between the bottom surface of the cavity and the free end.

In an embodiment of the invention, the grip portion respectively has a first sidewall and a second sidewall at two opposite sides of the cavity, and a thickness of the first sidewall is smaller than a thickness of the second sidewall.

In an embodiment of the invention, the base portion is adapted to connect a handheld electronic device, the handheld electronic device has a first side edge and a second side edge opposite to each other, a distance between the base portion and the first side edge is greater than a distance between the base portion and the second side edge, and the first sidewall and the second sidewall respectively face to the first side edge and the second side edge.

In an embodiment of the invention, the base portion is adapted to connect a handheld electronic device, the handheld electronic device has a first side edge and a second side edge opposite to each other, a distance between the base portion and the first side edge is greater than a distance between the base portion and the second side edge, and a distance between the bottom surface of the cavity and the handheld electronic device is gradually decreased along a direction from the second side edge to the first side edge.

In an embodiment of the invention, a material of the base portion, the grip portion and the stop portion is an elastic material.

In an embodiment of the invention, a material of the base portion, the grip portion and the stop portion is rubber.

In an embodiment of the invention, a hardness of the base portion, the grip portion and the stop portion is 70-90 degrees.

In an embodiment of the invention, the handle structure includes a support base, where the support base is connected to the base portion and is adapted to be assembled to a handheld electronic device.

In an embodiment of the invention, the handle structure has an exhaust passage, where the exhaust passage is connected between the cavity and an outer surface of the handle structure.

In an embodiment of the invention, the exhaust passage extends from the bottom surface of the cavity toward the base portion.

According to the above description, the handle structure of the invention has the cavity therein. Therefore, when the handheld electronic device and the handle structure at the back surface thereof drop to impact the ground, the handle structure may produce an enough deformation amount and distortion amount to provide good cushioning ability, so as to avoid damage of the display panel of the handheld electronic device due to the impact force of drop. Moreover, the bottom surface of the cavity is designed in incline. Therefore, when the handheld electronic device and the handle structure at the back surface thereof drop to impact the ground, the handle structure first contacting the ground may produce left and right asymmetric deformation, and the handheld electronic device is accordingly inclined and the edge of the electronic device contacts the ground, so that the impact force is dispersed to further decrease a chance of display panel damage.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
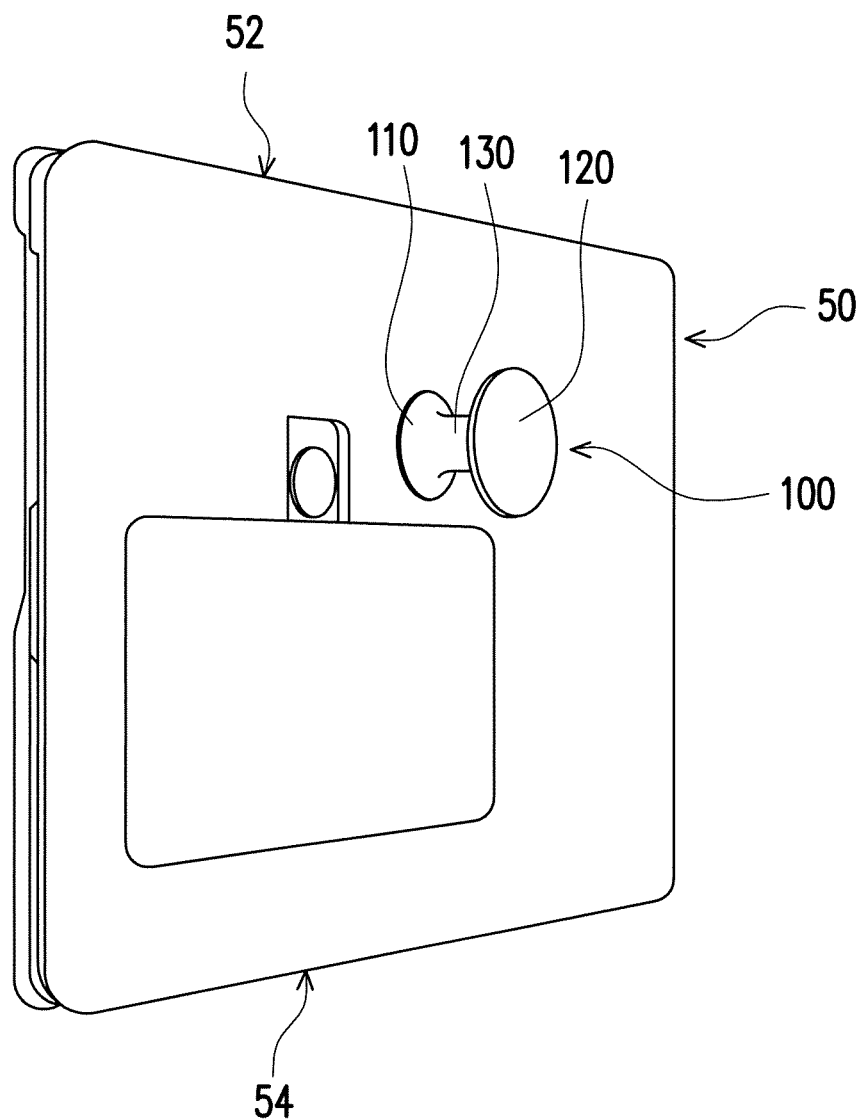
FIG. 1 is a three-dimensional view of a handle structure and a corresponding handheld electronic device according to an embodiment of the invention.

FIG. 1 is a three-dimensional view of a handle structure and a corresponding handheld electronic device according to an embodiment of the invention. Referring to FIG. 1, the handle structure 100 of the present embodiment is adapted to a handheld electronic device 50 (for example, a tablet personal computer) and includes a base portion 110, a stop portion 120 and a grip portion 130. The base portion 110 is connected to the handheld electronic device 50, and the grip portion 130 is connected between the base portion 110 and the stop portion 120. An outer diameter of the base portion 110 is greater than an outer diameter of the grip portion 130, and an outer diameter of the stop portion 120 is greater than the outer diameter of the grip portion 130. A user may put two fingers between the base portion 110 and the stop portion 120 to clamp the grip portion 130, such that the handheld electronic device 50 is supported on the user's hand.

Figure 2:
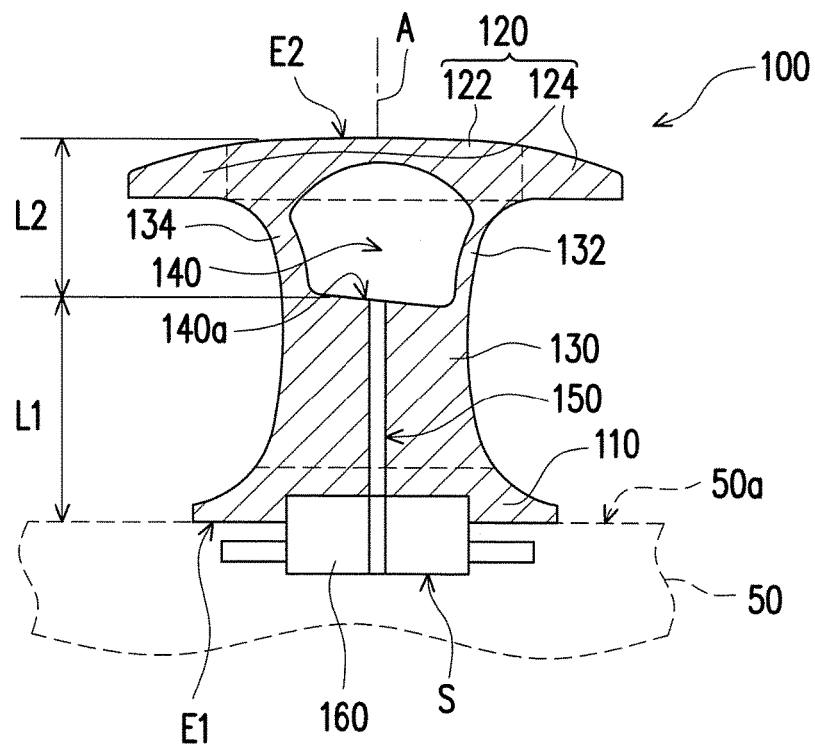
FIG. 2 is a cross-sectional view of the handle structure of FIG. 1.

FIG. 2 is a cross-sectional view of the handle structure of FIG. 1. Referring to FIG. 2, the handle structure 100 of the present embodiment has a cavity 140 therein. Therefore, when the handheld device 50 and the handle structure 100 thereon drop to impact the ground, the handle structure 100 may produce an enough deformation amount and distortion amount to provide good cushioning ability, so as to avoid damage of a display panel of the handheld electronic device 100 due to an impact force of drop.

In the present embodiment, a material of the base portion 110, the grip portion 130 and the stop portion 120 is, for example, rubble or other suitable types of elastic material, so as to produce an elastic deformation in case of impact. For example, a hardness of the base portion 110, the grip portion 130 and the stop portion 120 is, for example, but not limited to 70-90 degrees.

As shown in FIG. 2, the base portion 110 of the handle structure 100 of the embodiment is connected to a back surface 50a of the handheld electronic device 50. The cavity 140 has a bottom surface 140a, and the bottom surface 140a of the cavity 140 is inclined to an axial direction A of the grip portion 130, where the axial direction A is, for example, perpendicular to the back surface 50a of the handheld electronic device 50. Therefore, when the handheld electronic device 50 and the handle structure 100 thereon drop to impact the ground, the handle structure 100 first contacting the ground may produce left and right asymmetric deformation, and the handheld electronic device 50 is accordingly inclined and the edge of the handheld electronic device 50 contacts the ground, so that the impact force is dispersed to further decrease a chance of display panel damage. In the present embodiment, a tilt angle of the bottom surface 140a of the cavity 140 relative to the back surface 50a of the handheld electronic device 50 is, for example, 5 degrees, though the invention is not limited thereto.

Moreover, in the present embodiment, the grip portion 130 respectively has a first sidewall 132 and a second sidewall 134 at two opposite sides of the cavity 140, and a thickness of the first sidewall 132 is smaller than a thickness of the second sidewall 134. Such design avails the handle structure 100 to produce the aforementioned asymmetric deformation when the handle structure 100 impacts the ground, such that the edge of the handheld electronic device 50 contacts the ground to disperse the impact force. In the present embodiment, the thicknesses of the first sidewall 132 and the second sidewall 134 are, for example, respectively 1.2 mm and 2.2 mm, though the invention is not limited thereto.

Figure 3:
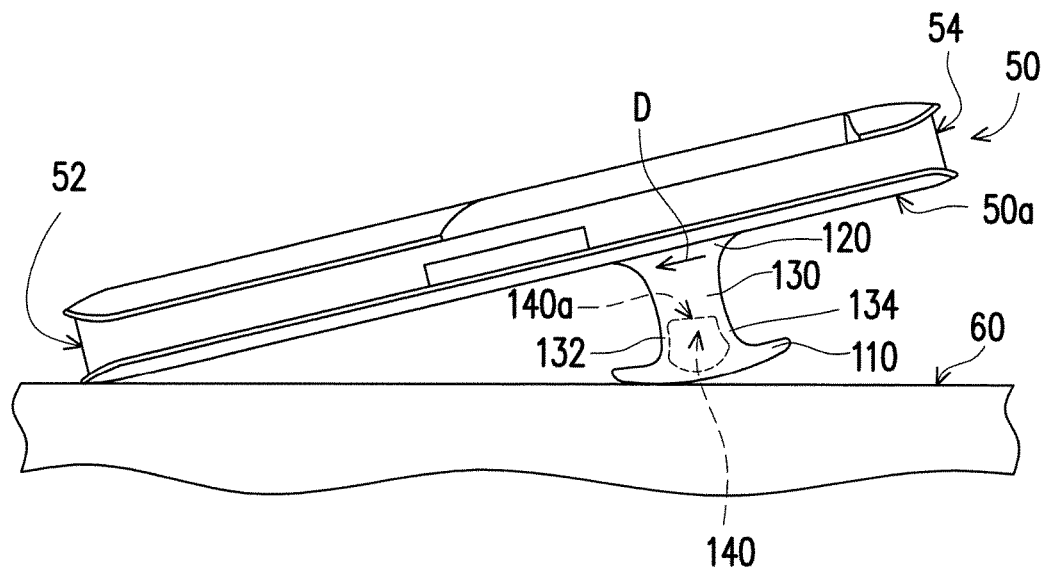
FIG. 3 is a side view of the handheld electronic device and the handle structure of FIG. 1.

FIG. 3 is a side view of the handheld electronic device and the handle structure of FIG. 1. To be specific, the handheld electronic device 50 has a first side edge 52 and a second side edge 54 opposite to each other as that shown in FIG. 3, and a distance between the base portion 120 and the first side edge 52 is greater than a distance between the base portion 120 and the second side edge 54. A distance between the bottom surface 140a of the cavity 140 and the back surface 50a of the handheld electronic device 50 is gradually decreased along a direction D from the second side edge 54 to the first side edge 52, and the first sidewall 132 with the smaller thickness and the second sidewall 134 with the larger thickness respectively face to the first side edge 52 and the second side edge 54. In this way, when the handle structure 100 impacting the ground produces the aforementioned asymmetric deformation due to inclination of the bottom surface 140a and a thickness difference between the first sidewall 132 and the second sidewall 134, the handheld electronic device 50 tilts toward the first side edge 52 and contacts the ground through the first side edge 52. Though the above description is only an example, and the invention is not limited thereto.

Configuration manner of the cavity 140 of the embodiment is described below in detail. As shown in FIG. 2, a part of the cavity 140 is located in the stop portion 120, and the other part of the cavity 140 is located in the grip portion 130, and the bottom surface 140a of the cavity 140 is located in the grip portion 130. Moreover, the handle structure 100 respectively has a fixed end E1 and a free end E2 opposite to each other at the base portion 110 and the stop portion 120, where a distance L1 between the bottom surface 140a of the cavity 140 and the fixed end E1 is greater than a distance L2 between the bottom surface 140a of the cavity 140 and the free end E2. For example, the distance L1 between the bottom surface 140a of the cavity 140 and the fixed end E1 is, for example, but not limited to twice of the distance L2 between the bottom surface 140a of the cavity 140 and the free end E2. In this way, the grip portion 130 has an enough length between the cavity 140 and the fixed end E1 for the user to grip, so as to avoid a situation that an excessively large extending range of the cavity 140 causes excessively soft of the whole structure of the grip portion 130 to result in a fact that the grip portion 130 is hard to grip.

Referring to FIG. 2 the stop portion 120 of the present embodiment includes a central region 122 and a surrounding region 124, the surrounding region 124 surrounds the central region 122, the grip portion 130 is connected to the central region 122, and the cavity 140 does not extend to the surrounding region 124. In this way, when the handheld electronic device 50 and the handle structure 100 thereof is placed on a plane 60 as that shown in FIG. 3, a situation that the stop portion 120 is hard to stably support the handheld electronic device 50 due to excessively soft of the surrounding region 124 caused by excessively large extending range of the cavity 140 is avoided.

The handle structure 100 of the present embodiment has an exhaust passage 150, and the exhaust passage 150 extends from the bottom surface 140a of the cavity 140 toward the base portion 110 and is connected between the cavity 140 and an outer surface S of the handle structure 100, such that the air in the cavity 140 can be connected to external through the exhaust passage 150, and the handle structure 100 can be smoothly compressed and recovered. Moreover, the handle structure 100 of the present embodiment includes support base 160, where a material of the support base 160 is, for example, but not limited to a metal such as aluminium, stainless steel, etc., and the support base 160 is connected to the base portion 110 and is adapted to be assembled to the back surface 50a of the handheld electronic device 50 in a buckling manner or other proper manner.

In summary, the handle structure of the invention has the cavity therein. Therefore, when the handheld electronic device and the handle structure at the back surface thereof drop to impact the ground, the handle structure may produce an enough deformation amount and distortion amount to provide good cushioning ability, so as to avoid damage of the display panel of the handheld electronic device due to the impact force of drop. Moreover, the bottom surface of the cavity is designed in incline. Therefore, when the handheld electronic device and the handle structure at the back surface thereof drop to impact the ground, the handle structure first contacting the ground may produce left and right asymmetric deformation, and the handheld electronic device is accordingly inclined and the edge of the electronic device contacts the ground, so that the impact force is dispersed to further decrease a chance of display panel damage.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handle structure, comprising:
   a base portion;
   a stop portion; and
   a grip portion, connected between the base portion and the stop portion, wherein the handle structure has a cavity therein, the cavity has a bottom surface, and the bottom surface of the cavity is inclined to an axial direction of the grip portion.

2. The handle structure as claimed in claim 1, wherein the base portion is adapted to connect a back surface of a handheld electronic device, and the axial direction of the grip portion is perpendicular to the back surface of the handheld electronic device.

3. The handle structure as claimed in claim 1, wherein the bottom surface of the cavity is located in the grip portion.

4. The handle structure as claimed in claim 1, wherein a part of the cavity is located in the stop portion, and the other part of the cavity is located in the grip portion.

5. The handle structure as claimed in claim 1, wherein an outer diameter of the base portion is greater than an outer diameter of the grip portion, and an outer diameter of the stop portion is greater than the outer diameter of the grip portion.

6. The handle structure as claimed in claim 1, wherein the stop portion comprises a central region and a surrounding region, the surrounding region surrounds the central region, the grip portion is connected to the central region, and the cavity does not extend to the surrounding region.

7. The handle structure as claimed in claim 1, wherein the handle structure respectively has a fixed end and a free end opposite to each other at the base portion and the stop portion, and a distance between the bottom surface of the cavity and the fixed end is greater than a distance between the bottom surface of the cavity and the free end.

8. The handle structure as claimed in claim 7, wherein the distance between the bottom surface of the cavity and the fixed end is twice of the distance between the bottom surface of the cavity and the free end.

9. The handle structure as claimed in claim 1, wherein the grip portion respectively has a first sidewall and a second sidewall at two opposite sides of the cavity, and a thickness of the first sidewall is smaller than a thickness of the second sidewall.

10. The handle structure as claimed in claim 9, wherein the base portion is adapted to connect a handheld electronic device, the handheld electronic device has a first side edge and a second side edge opposite to each other, a distance between the base portion and the first side edge is greater than a distance between the base portion and the second side edge, and the first sidewall and the second sidewall respectively face to the first side edge and the second side edge.

11. The handle structure as claimed in claim 1, wherein the base portion is adapted to connect a handheld electronic device, the handheld electronic device has a first side edge and a second side edge opposite to each other, a distance between the base portion and the first side edge is greater than a distance between the base portion and the second side edge, and a distance between the bottom surface of the cavity and the handheld electronic device is gradually decreased along a direction from the second side edge to the first side edge.

12. The handle structure as claimed in claim 1, wherein a material of the base portion, the grip portion and the stop portion is an elastic material.

13. The handle structure as claimed in claim 1, wherein a material of the base portion, the grip portion and the stop portion is rubber.

14. The handle structure as claimed in claim 1, wherein a hardness of the base portion, the grip portion and the stop portion is 70-90 degrees.

15. The handle structure as claimed in claim 1, further comprising:
   a support base, connected to the base portion and adapted to be assembled to a handheld electronic device.

16. The handle structure as claimed in claim 1, further comprising:
   an exhaust passage, connected between the cavity and an outer surface of the handle structure.

17. The handle structure as claimed in claim 16, wherein the exhaust passage extends from the bottom surface of the cavity toward the base portion.

\* \* \* \* \*